(12) United States Patent
Preston

(10) Patent No.: US 6,726,150 B2
(45) Date of Patent: Apr. 27, 2004

(54) METHOD AND APPARATUS FOR STIFFENER REINFORCEMENT OF A RAM AIR PARACHUTE CANOPY

(76) Inventor: Daniel Preston, 82-18 138th St., Kew Gardens, NY (US) 11435

( * ) Notice: Subject to any disclaimer, the term of this patent is extended or adjusted under 35 U.S.C. 154(b) by 0 days.

(21) Appl. No.: 10/315,488

(22) Filed: Dec. 9, 2002

(65) Prior Publication Data
US 2003/0183725 A1 Oct. 2, 2003

Related U.S. Application Data

(60) Provisional application No. 60/341,002, filed on Dec. 7, 2001.

(51) Int. Cl.[7] ................................. B64D 17/20
(52) U.S. Cl. ..................... 244/145; 244/142
(58) Field of Search ................. 244/142, 145, 244/147, 138 R

(56) References Cited

U.S. PATENT DOCUMENTS 3,851,348 A * 12/1974 Gilbert et al.
4,708,078 A * 11/1987 Legaignoux et al.
5,303,883 A * 4/1994 Brewer et al.
5,398,614 A * 3/1995 Koenig
5,431,506 A * 7/1995 Masunaga

FOREIGN PATENT DOCUMENTS

DE 3641790 * 3/1988 ................ 244/145
EP 163966 * 12/1985 ................ 244/145

* cited by examiner

Primary Examiner—Tien Dinh
(74) Attorney, Agent, or Firm—Mintz, Levin, Cohn, Ferris, Glovsky and Popeo, P.C.

(57) ABSTRACT

The present invention provides a method and apparatus for reinforcing the nose of a deployable, ram air parachute. Stiffeners, formed of a super-elastic alloy, are attached to the ribs of the parachute canopy at the nose. The stiffeners can be easily crushed for packing of the parachute and return to their original shape upon deployment. The stiffeners are maintained in a desired shape through heat treatment or through attachment points to the rib. The stiffeners are light and add no pack volume as they are fashioned from small diameter wire into substantially ring shaped springs. The reinforcement of the nose prevents airfoil deformation due to head wind and greatly improves the efficiency of the ram air parachute.

13 Claims, 2 Drawing Sheets

METHOD AND APPARATUS FOR STIFFENER REINFORCEMENT OF A RAM AIR PARACHUTE CANOPY

This application claims priority to U.S. Provisional Application Ser. No. 60/341,002, filed Dec. 7, 2001.

BACKGROUND OF THE INVENTION

1. Field of the Invention

The present invention relates to generally to ram air parachutes and more particularly to a design of a canopy of a ram air parachute.

2. Discussion of Related Art

Parachutes have evolved over the years into highly sophisticated systems, and often include features that improve the safety, maneuverability, and overall reliability of the parachutes. Initially, parachutes included a round canopy. A parachute harness skydiver was connected to the canopy by suspension lines disposed around the periphery of the canopy. Such parachutes severely lacked control. The user was driven about by winds without any mechanism for altering direction. Furthermore, such parachutes had a single descent rate based upon the size of the canopy and the weight of the parachutist.

In the mid-1960's the parasol canopy was invented. Since then, variations of the parasol canopy have replaced round canopies for most applications, particularly for aeronautics and the sport industry. The parasol canopy, also known as a ram air canopy, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspension lines are attached along at least some of the ribs to maintain the orientation of the canopy relative to the ground. The canopy of the ram air parachute functions a wing to provide lift and forward motion. Guidelines operated by the user allow deformation of the canopy to control direction and speed. Ram air parachutes have a high degree of maneuverability.

Canopies are flexible and stretchable membrane structures, they distort based upon mechanical and aerodynamic tensions, stresses, airflows and pressure distribution. Although a cell is modeled as having a basically rectangular cross section, when inflated the shape distorts towards round with complex distortions. Under canopies of conventional design, the leading edge or nose of the ram air parachute is deformed during flight. With forward motion, the head-on wind overcomes the internal pressurization of the canopy, and deforms the nose of the canopy. This distortion blunts the nose of the airfoil or even indents it, and impairs the aerodynamics of the parachute wing. The parachute flies less efficiently as a result. Therefore, a need exists for a ram air parachute canopy which reduces deformations of the nose.

Para-gliders and powered parachutes, which operate with similar designs to ram air parachute canopies, overcome the deformation problem by including "stiffeners" in the nose of the canopy. Typically, the stiffeners are plastic or mylar sheets sewn on the vertical ribs of the canopy into the nose. The stiffeners reinforce the nose of the canopy and help maintain its shape. The stiffeners also function to keep open the inlets of the canopy when not inflated to aid in the launching of para-gliders and powered parachutes.

However, the stiff plastic or mylar used in paragliders and powered parachutes is not applicable to skydiving or other freefall deployable parachutes. A deployable system must be packed into a small space and must open efficiently. The stiffeners cannot be compressed as required for packing the parachute. When stiffeners become crushed, they remain creased or bent and create additional deformation of the nose of the canopy, which hinders proper operation of the parachute. Packing for free fall deployment of such para-glider or powered parachute is not possible due to the stiffeners.

Accordingly, there exists a need for a stiffener for use on a parachute to reduce nose-deformation to improve the canopy's aerodynamics, which may be folded and packed as known in the art of deployable parachutes.

SUMMARY OF THE INVENTION

The deficiencies of prior art ram air parachutes are substantially overcome by the present invention which provides flexible stiffeners to prevent deformation of the nose of the canopy during flight. According to one aspect of the invention, the flexible stiffeners are wire rings that act as springs to reinforce the nose. The ring springs are formed from a super-elastic metal alloy, i.e. nickel titanium such that they can be greatly deformed during packing and recover without kinking. Such Ni—Ti alloys are over 8 times more deformable than spring steel. The stiffeners may be ring shaped or heat memorized into a formed shape i.e. a D shape during manufacture. Additionally the stiffeners may be attached to the vertical ribs by various methods but preferably by sewing a pocket in the section of the nose to be reinforced and inserting the stiffener ring spring. Additionally the pocket can pre-stress the ring spring into a different shape that it is at rest. I.e. from a round ring to a D shape to exactly match the leading edge of the airfoil. This has the added benefit of biasing the spring in the direction of the head on wind that acts to deform the airfoil.

DETAILED DESCRIPTION OF PREFERRED EMBODIMENTS

Figure 1:
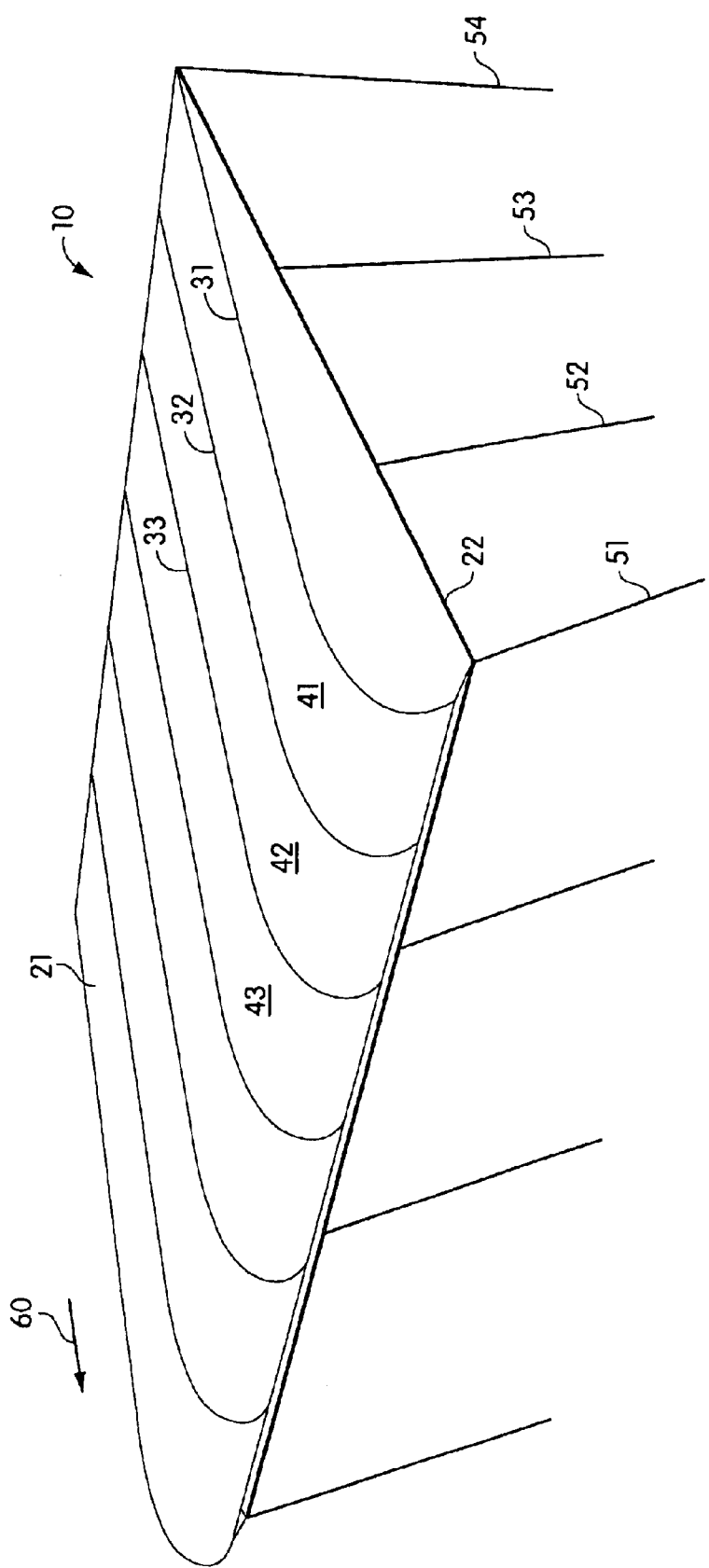
FIG. 1 is a perspective view of a ram air parachute.

FIG. 1 illustrates a canopy of a ram air parachute 10 according to an embodiment of the present invention. The ram air parachute 10 includes a top skin 21 and bottom skin 22. A plurality of vertical ribs 31, 32, 33 are formed between the top skin 21 and the bottom skin 22 forming a plurality of cells 41, 42, 43. Typically, ram air parachutes to which the present invention applies have seven or nine cells. However, any number of cells can be used in connection with the present invention. Suspension lines 51, 52, 53, 54 are attached to at least some of the plurality of ribs. Not all of the suspension lines are shown in FIG. 1. Generally, suspension lines are attached to every other rib in the ram air parachute. The suspension lines are connected together to provide proper suspension of the user below the canopy and maintain the orientation of the canopy with respect to the pilot. The airfoil shape of the canopy induces forward motion, illustrated as 60, to the canopy and the user.

Figure 2:
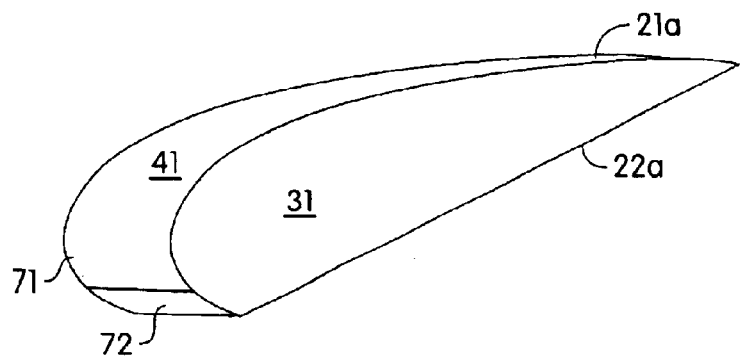
FIG. 2 is a perspective view of a cell of a ram air parachute.
Figure 3:
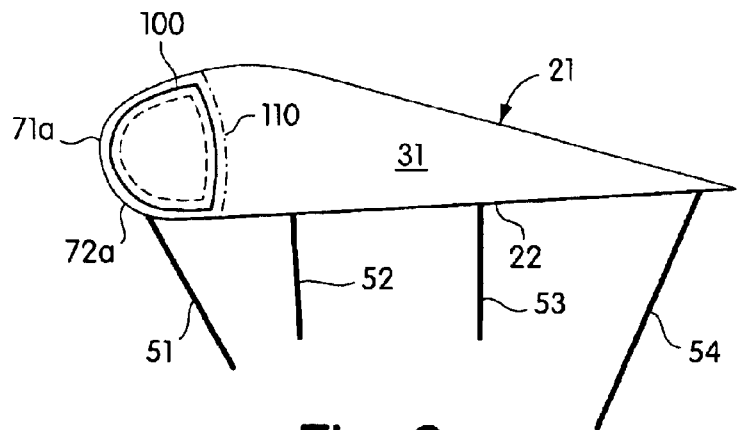
FIG. 3 is a side view of a vertical rib of a ram air parachute according to an embodiment of the present invention.

FIG. 2 illustrates a cell 41 of the canopy. Each cell 41 is formed by a portion of the top skin 21a, a portion bottom skin 22a, and two vertical ribs 31, 32. At the nose 71 of the cell 41 is an inlet 72 to allow air to enter the cell. FIG. 3 illustrates a vertical rib 31 of the canopy having a stiffener 100 according to an embodiment of the present invention.

The stiffener 100 is in the form of a ring and provides reinforcement to the leading edge shape of the nose 71a of the rib 31. The stiffener can be formed and attached to the rib in various ways. The stiffener is formed of an elastic alloy, and preferably a super-elastic alloy such as Nitanol (nickel-titanium alloy). The super-elastic alloys can be bent more than normal metal alloys without creasing or deforming. They are self-annealing at their designed operating temperature range. In addition to nickel-titanium, copper-zinc, copper-aluminum-nickel, and nickel-titanium-copper are known super-elastic alloys. Such alloys have different properties with various temperature range requirements. The alloy for the stiffener must be usable at the temperate ranges in which the parachute is to be used.

Figure 4:
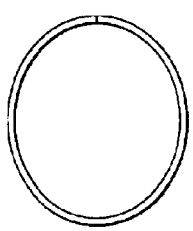
FIG. 4 is a side view of a ring shaped stiffener according to an embodiment of the present invention.
Figure 5:
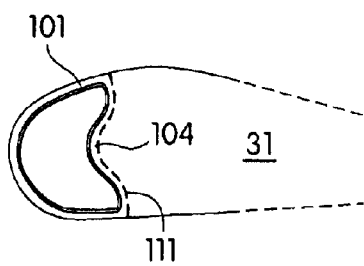
FIG. 5 is a side view of an applied stiffener according to an embodiment of the present invention.

According to one embodiment of the invention, the super-elastic alloy is formed into a predetermined shape for fitting a particular nose shape of a canopy. The super-elastic alloy is then treated with heat to retain the desired shape of the stiffener 100. The stiffener 100, in the desired shape, is attached to the rib of canopy. Different methods can be used for attaching the stiffener 100 to the canopy. Preferably, a pocket 110 of a flexible material is stitched on the nose 71a of the rib 31. The stiffener 100 is placed in the pocket 110. The pocket 100 may be correspond in the desired shape of the stiffener 100, as illustrated in FIG. 3 or could force the ring spring into a different shape. Alternatively, stitching could be used to attach the stiffener to the rib. A second embodiment of the stiffener 101 is illustrated in FIG. 4. In the second embodiment, the stiffener 101 is formed of a straight wire length of super-elastic alloy. The two ends of the wire are connected together to form a circle, but the alloy is not heat treated. The stiffener 101 is inserted in a pocket 111 on the rib. The pocket 111 maintains the desired shape of the stiffener 101. As illustrated in FIG. 5, the pocket 111 may be formed such that a back side of the stiffener 104 is bowed to provide a spring bias. Preferably, stiffeners 100 are used on all of the ribs of the canopy. However, they may be used on only some of the ribs, if desired.

During packing of the parachute, the stiffeners 100 are crushed and deformed. However, since the stiffeners 100 are formed of a super-elastic alloy, upon deployment, they return to the desired shape, either as heat treated or as controlled by the pocket. The desired shape provides forces on the nose of the canopy to maintain the shape at each of the ribs and to prevent deformation of the nose due to head-winds. The reduction in deformation greatly improves the efficiency of the parachute wing.

Although the present invention has been described, and has certain advantages, with respect to deployable parachutes, it can also be applied to para-gliders and powered parachutes. Additionally, the improved performance and advantages of the present invention allow use of para-gliders and powered parachutes which are deployable in a free-fall environment. While the present inventions have been described with a certain degree of particularity, it is obvious from the foregoing detailed description that one skilled in the art may make one or more modifications which are suggested by the above descriptions of the novel embodiments. Such alterations and modification are part of the present invention which is limited solely by the claims appended hereto.

What is claimed is:

1. A stiffener for a ram air parachute, the ram air parachute having a top skin, a bottom skin, and a plurality of vertical ribs between the top skin and the bottom skin, the stiffener comprising:

a spring material formed as a wire loop in a desired shape; and spring attachment means for attaching the spring material to at least one of the plurality of vertical ribs to reduce distortion of the nose of the parachute.

2. The stiffener of claim 1, wherein the spring material is a super-elastic alloy.

3. The stiffener of claim 2, wherein the super-elastic alloy is heat treated to maintain the desired shape.

4. The stiffener of claim 2, wherein the super-elastic alloy includes a nickel-titanium alloy.

5. The stiffener of claim 1, wherein the spring material is formed in substantially a circular ring shape.

6. The stiffener of claim 1, wherein the spring attachment means includes a pocket formed on the at least one vertical rib.

7. A ram air parachute comprising:

a top skin;

a bottom skin;

a plurality of vertical ribs disposed between the top skin and the bottom skin; and at least one stiffener of a spring material formed as a wire loop attached to at least one of the plurality of vertical ribs.

8. The ram air parachute of claim 7, wherein the at least one stiffener is of a super-elastic alloy.

9. The ram air parachute of claim 7, wherein the at least one stiffener includes a plurality of stiffeners, each stiffener being attached to a corresponding one of the plurality of vertical ribs.

10. The ram air parachute of claim 7 wherein the at least one of the vertical ribs includes a pocket for attaching the at least one stiffener to the at least one rib.

11. The ram air parachute of claim 10, wherein the pocket is formed to provide a shape to the at least one stiffener for reducing distortion of the nose of the parachute during flight.

12. A stiffener for attachment to a ram air parachute to reinforce a nose and to reduce distortion of the ram air parachute, the stiffener comprising a loop of super-elastic wire attached to a rib of the parachute.

13. The stiffener of claim 12, wherein the stiffener is capable of being compressed during packing of the ram air parachute for deployment and capable of returning substantially to its prior shape upon deployment.

* * * * *